United States Patent

[11] 3,574,325

[72] Inventor Paul D. Agarwal
           Birmingham, Mich.
[21] Appl. No. 800,621
[22] Filed Feb. 19, 1969
[45] Patented Apr. 13, 1971
[73] Assignee General Motors Corporation
           Detroit, Mich.

[54] BRAKING SYSTEM FOR ELECTRIC MOTORS
     6 Claims, 3 Drawing Figs.
[52] U.S. Cl. ................................................. 188/156,
                                    188/90, 188/264, 310/54
[51] Int. Cl. ....................................................... F16d 65/36
[50] Field of Search ........................................... 188/156,
                                    264.22, 90; 303/3; 310/54, 59

[56]                References Cited
              UNITED STATES PATENTS
2,188,398  1/1940  Bernard ......................  310/54
3,171,505  3/1965  Imelmann ....................  188/156X Primary Examiner—George E. A. Halvosa
Attorneys—C. R. Meland and E. W. Christen ABSTRACT: A braking system for electric motors and particularly a braking system for braking an induction motor which is utilized to propel a vehicle. The braking system utilizes combined hydraulic and electric braking where the interior of the electric motor is flooded with a fluid cooling medium such as oil at the same time that the motor is connected in an electric braking mode of operation. The cooling oil which is supplied to the interior of the motor provides a viscous drag on the rotor of the motor since it fills the air gap of the motor and, therefore, impedes rotation of the motor rotor. The electric braking, which takes place at the same time as the hydraulic braking, can be performed by a braking operation where the stator winding is connected with a source of direct current or can be performed by a plugging operation where two of the input leads to a polyphase motor have their connections to a source of alternating current reversed. During the electric braking heat is generated in the rotor of the motor and the cooling oil performs the function of a hydraulic retarder as well as cooling the rotor during the time that the motor is operating in a braking mode. The invention is particularly useful in braking electrically powered vehicles for extended periods of time where the vehicle is propelled by an electric motor.

INVENTOR.
Paul D. Agarwal
BY
C. R. Meland
ATTORNEY

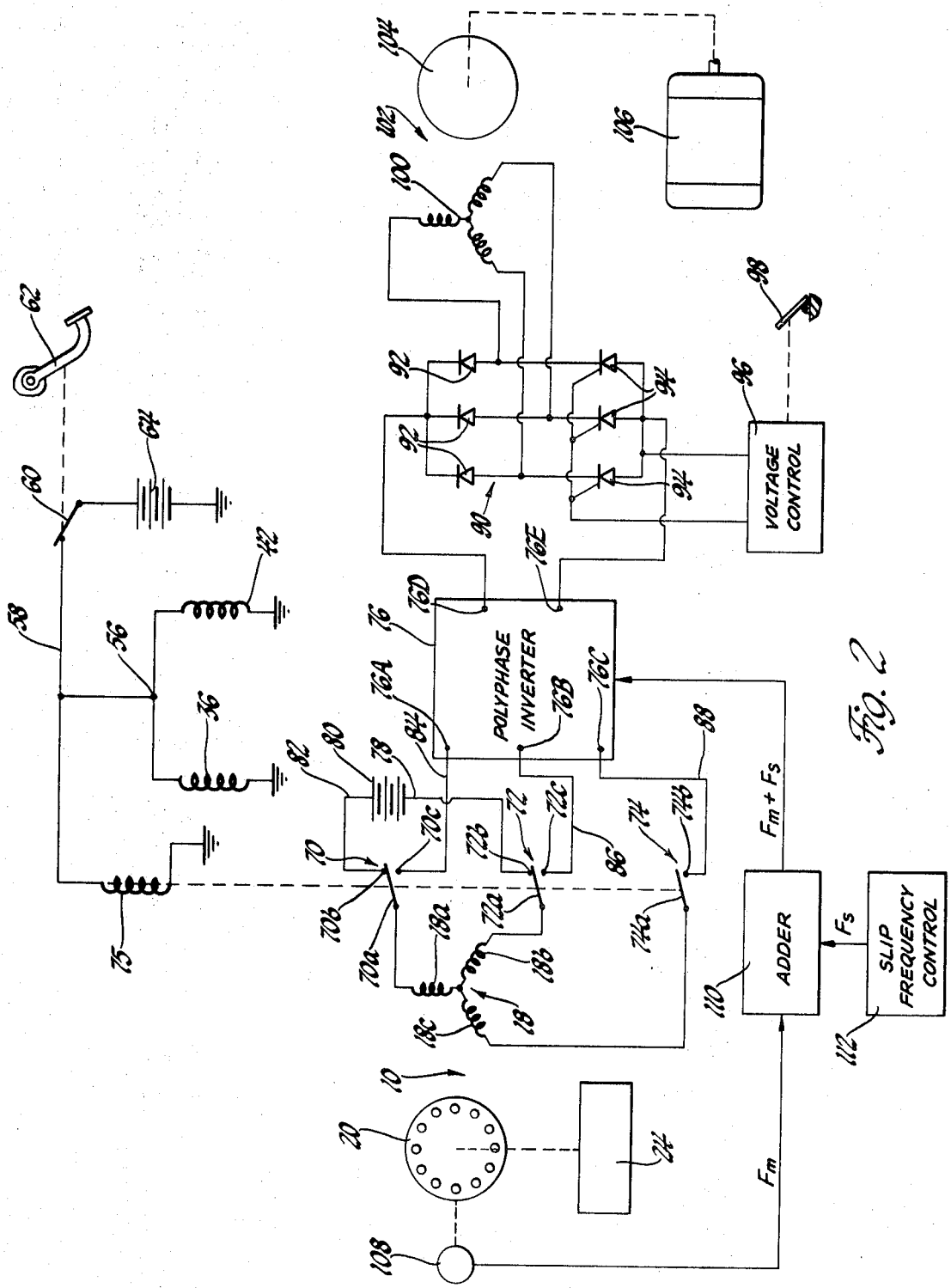

BRAKING SYSTEM FOR ELECTRIC MOTORS

This invention relates to a method of braking an electric motor and more particularly to a method of braking a polyphase induction motor which is utilized to propel a motor vehicle.

It is known in the art of electric braking for induction motors to electrically brake the motor by methods such as plugging or by disconnecting the stator winding of the motor from a source of alternating current and then connecting the stator winding of the motor to a source of direct current. In utilizing the plugging method of electric braking, two of the connections from the power source to the motor are reversed causing the motor to be electrically braked. In either case, a large amount of heat is generated in the squirrel cage rotor of the induction motor and if braking is continued for a long period of time, for example, when attempting to slow down an electrically powered vehicle, the rotor may become overheated.

In contrast to known braking systems for electric motors, where only electric braking is utilized, it is an object of this invention to provide a braking system where the motor is electrically braked but where in addition to electric braking the interior of the motor is supplied with a coolant such as oil during the electric braking cycle which performs two functions. The first function of the coolant is to cool the rotor of the machine during the electric braking and the other function of the coolant is to provide a viscous drag on the rotor which aids the electric braking in slowing down rotation of the rotor. It therefore is seen that this invention proposes utilizing a combined hydraulic and electric braking arrangement where a cooling medium provides hydraulic braking and also serves to cool the rotor which has heat generated therein due to the electric braking mode of operation.

Another object of this invention is to provide a combined hydraulic and electric brake for an electric motor where the control of the electric braking and the supply of cooling medium to the interior of the motor is controlled by a control device such a brake pedal on a motor vehicle. With the arrangement just described the actuation of the brake pedal electrically connects the motor in a braking mode while simultaneously operating a fluid supply control means to cause a coolant such as oil to be supplied to the interior of the motor.

Still another object of this invention is to provide a braking system for an electrically powered vehicle where the vehicle receives motive power from an electric motor and where the electric motor is simultaneously electrically and hydraulically braked when a control device such as a brake pedal is actuated.

In the Drawings:

FIG. 2 is a schematic circuit diagram of a braking system for an induction motor which can be utilized in the system of FIG. 1 and which causes the induction motor to be braked by applying direct current to the stator winding of the motor.

Figure 1:
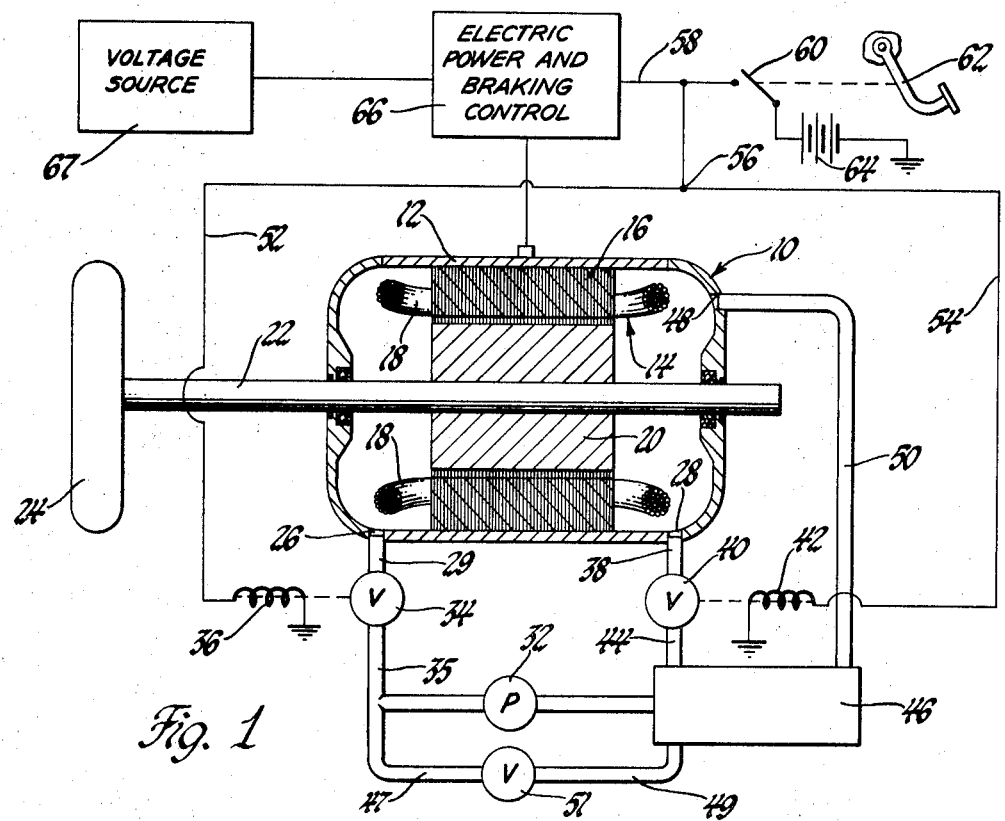
FIG. 1 is a schematic diagram illustrating the combined electric and hydraulic braking system of this invention.

Referring now to the drawings and more particularly to FIG. 1, an induction motor is illustrated which is generally designated by reference numeral 10. This induction motor has a fluid-tight housing 12 which supports a stator assembly generally designated by reference numeral 14. The stator assembly comprises the usual magnetic core 16 formed of steel laminations which have slots. The slots receive a polyphase stator winding 18 which preferably is of the Y-connected type as will become more readily apparent hereinafter. The induction motor 10 further includes a squirrel cage rotor 20 which is connected with an output shaft 22. The output shaft 22 is shown connected with a wheel 24 which may be, for example, a driving wheel on an electrically powered motor vehicle.

The housing 12 of the electric motor 10 has a fluid inlet passage 26 and a fluid outlet passage 28. The fluid inlet passage 26 is connected with an inlet pipe 29 which is connected to the outlet side of a hydraulic pump 32 through a solenoid-controlled valve 34 and pipe 35. The pump 32 is driven by a suitable power source (not shown). The solenoid controlled valve 34 includes a coil 36 and this valve is of the type that is normally closed but which is opened whenever the solenoid coil 36 is electrically energized. As one example, the valve may be normally held closed by a spring (not shown) and when the coil 36 is energized, the valve is opened against the force of the spring.

The outlet passage 28 is connected with a pipe 38 which is connected with a solenoid operated valve 40. The valve 40 is operated by solenoid coil winding 42 and this valve is of the type that is normally held open, for example, by a spring but which is closed whenever the coil winding 42 is electrically energized. The solenoid valve 40 is connected between pipe 38 and a pipe 44 which is connected to a sump or reservoir 46.

The housing 12 of the induction motor 10 has another outlet opening 48 located near the top of the motor and this opening is connected with the sump or reservoir 46 by a pipe 50. It is seen that the inlet side of pump 32 is connected with the reservoir 46.

The solenoid coils 36 and 42 are connected respectively with conductors 52 and 54 which in turn are connected to a junction 56. The junction 56 is connected with a conductor 58 which is connected with a fixed contact of braking control device which takes the form of a control switch 60. The control switch 60 is operated by a brake pedal 62 on the vehicle and when it is desired to brake the vehicle the brake pedal is depressed to close the switch 60. The movable contact of the switch 60 is connected to one side of a source of direct current 64 the opposite side of this source being grounded. It will be appreciated, therefore, that whenever the brake pedal 62 is depressed to close switch 60, the solenoid coils 36 and 42 for the solenoid valves will be energized. The conductor 58 in addition to controlling the energization of the coils 36 and 42 also controls an electric power and braking control designated by reference numeral 66 which when energized causes the electric motor to operate in a braking mode. This electric braking control will be described in detail when describing the systems shown in FIGS. 2 and 3 and it is seen that it is connected with a source of voltage 67 which provides electric braking in a manner to be described.

The operation of the hydraulic braking arrangement for the electric motor 10 will now be described keeping in mind that the motor is connected in an electric braking mode at the same time as hydraulic braking takes place. When the operator of the vehicle depresses the brake pedal 62, the coils 36 and 42 are energized causing the valve 34 to open and the valve 40 to close. A cooling medium which is preferably oil is now forced into the interior of the motor housing 12 by the pump 32. The motor housing now fills with oil filling the airgap between the rotor 20 and the stator 14 and providing a viscous drag to rotation of the rotor 20. The oil continues to be supplied to the interior of the motor and when it reaches the level of the opening 48, the oil is circulated through the motor to provide a viscous drag on the rotor and to also cool the rotor and stator during the electric braking operation. At this time, a large amount of heat is being generated in the rotor 20 as will be more fully described hereinafter and this heat is dissipated by the cooling oil.

When the operator of the electric powered vehicle desires to terminate braking, he releases the brake pedal causing the switch 60 to open. This will deenergize coils 36 and 42 causing the valve 34 to close and the valve 40 to open. The oil that is contained in the motor housing is now drained from the motor housing through the open valve 40 with the result that there no longer is hydraulic braking of the motor. At the same time, electric braking is terminated since when the switch 60 opens, the electric braking control 66 is no longer energized.

In order to prevent excessive pressure in line 35 when valve 34 is closed, the system can include a hydraulic circuit comprised of pipes 47 and 49 and valve 51 connected the outlet side of pump 32 to sump 46. The valve 51 can be a suitable pressure relief valve which opens when the pressure in line 35 exceeds a predetermined value to open a path between the outlet and inlet sides of the pump. Where a pressure relief valve is not desired, the valve 51 could be arranged to be operated by coil 36 in such a fashion that valve 51 is open when valve 34 is closed and vice versa.

Referring now to FIG. 2, a complete schematic diagram of an electric control system is illustrated including connections to the coils 36 and 42 which operate the valves 26 and 28 to control hydraulic braking. The FIG. 2 system includes the source of power for the motor and also illustrates one electric braking arrangement where the stator winding of the motor is disconnected from a source of alternating current and then supplied with direct current to provide the electric braking operation. In FIG. 2, the same reference numerals have been used as were used in FIG. 1 to identify the same parts in each FIG.

In FIG. 2, the induction motor is again designated by reference numeral 10 and includes the three phase Y-connected stator winding 18 formed of phase windings 18a, 18b, and 18c and the squirrel cage rotor 20. The electric braking control in FIG. 2 comprises relay operated switches 70, 72 and 74 which are controlled by a relay coil 75 connected between conductor 58 and ground. The switch 70 has a movable contact 70a and fixed contacts 70b and 70c. The switch 72 has a movable contact 72a and fixed contacts 72b and 72c while switch 74 is provided with a movable contact 74a and a fixed contact 74b. The movable contacts 70a, 72a, and 74a are respectively connected with the phase windings 18a, 18b, and 18c of the stator winding 18. The fixed contacts 70c, 72c, and 74b are connected respectively with alternating current output terminals 76A, 76B and 76C of a polyphase inverter designated by reference numeral 76. The fixed contact 72b of the switch 72 is connected to a conductor 78 which is connected to one side of a source of direct current 80. The opposite side of the source of direct current 80 is connected with conductor 82 which in turn is connected to fixed contact 70b.

The movable contacts 70a, 72a, and 74a are shown illustrated in a position they assume when the relay coil 75 is electrically energized and in a position to provide electric braking. The position of these contacts, when electric braking is not desired, is such that 70a engages 70c, 72a engages 72c, and 74a engages 74b. When coil 75 is energized and the contacts are shifted into the position shown in FIG. 2, the stator winding 18 will be supplied with direct current from the direct current source 80. This circuit can be traced from the positive side of the direct current source 80, through conductor 82, through closed contacts 70b and 70a to phase winding 18a through phase windings 18a and 18b and then to the negative side of the direct current source 80 through closed contacts 72a and 72b and conductor 78. This provides electric braking for the motor which generates heat in the rotor 20 which as previously described is dissipated by the cooling oil that is supplied to the interior of the motor during the electric braking operation. The cooling oil is supplied at the same time that electric braking takes place because closure of switch 60 provides electric braking as well as energization of coils 36 and 42 which initiate hydraulic braking and cooling.

When the relay coil 75 is not energized as when switch 60 is open, the movable contact 70a engages fixed contact 70c, movable contact 72a engages fixed contact 72c and movable contact 74a engages fixed contact 74b. As a result of this connection, the output terminals of the inverter 76 will supply power to the polyphase winding 18 through power supply conductors 84, 86 and 88 and through the switches 70, 72 and 74.

The inverter 76 can take various forms as long as it is capable of converting a direct current input to a variable frequency AC output. The inverter, for example, can be of the type that utilizes controlled rectifiers as switching elements and can be of the type, for example, shown in U.S. Pat. No 3,323,032 to Agarwal et al., U.S. Pat. No. 3,384,840 to Salihi.

The direct current input terminals of the inverter 76 are designated by reference numerals 76D and 76E. These input terminals are connected with the direct current output terminals of a three phase full-wave bridge circuit designated by reference numeral 90. This bridge circuit is comprised of three silicon diodes 92 and three controlled rectifiers 94. The gates of the control rectifiers 94 are connected with a voltage control device 96 which in turn is controlled by an accelerator pedal 98 on the vehicle. The voltage control devices 96 can be conventional circuit which controls the firing of the control rectifiers 94 to thereby control the amount of direct current supplied to the input terminals of the inverter as a function of accelerator pedal position.

The bridge rectifier 90 is connected with the output winding 100 of an alternating current generator 102. The output winding 100 is a three phase Y-connected winding and is connected with the AC input terminals of the bridge circuit 90. The rotor 104 of the generator is mechanically connected to a prime mover 106 and driven thereby. This prime mover may be, for example, an internal combustion engine, a turbine, or any other type of reciprocating or rotating engine.

If desired, the power supply system can include a known arrangement for controlling the slip frequency of the induction motor 10. Such slip frequency control is described in the above-mentioned U.S. Pat. No. 3,323,032 to Agarwal et al., and when such a system is utilized, the rotor 20 is coupled to a device 108 which provides signal information that is a function of actual rotor speed of motor 10. This signal information is fed to an adder 110 which has another input from a slip frequency control 112. The output of the adder 110 is utilized to control the output frequency of the inverter 76 in a manner described in the above-mentioned Agarwal et al. patent. With the arrangement that has been described, signal information $F_m$ which is a function of actual rotor speed is supplied to the adder 110 while signal information $F_s$ which is a function of the slip frequency is also supplied to the adder 110. The adder adds these inputs and the output of the adder is then a signal $F_m+F_s$ and this signal dictates the output frequency of the inverter 76 to provide a controlled slip frequency for the motor. The functions $F_m$ and $F_s$ can be added mechanically by a differential and it is also possible to add these functions electrically either by digital methods or by an electromagnetic differential as disclosed in the above-mentioned Agarwal et al. patent.

It will be appreciated that with the system of FIG. 2, both the input voltage and the slip frequency of the induction motor 10 can be controlled and it will also be appreciated that the system is braked by a combination of electric and hydraulic braking whenever the brake pedal 62 is depressed to close the switch 60.

The alternating current power supply for the induction motor can take a wide variety of forms other than that illustrated in FIG. 2. Thus this power supply can include a cycloconverter fed by the AC generator 102 rather than a rectifier circuit and inverter for supplying a controlled voltage and frequency to the induction motor. In addition, the inverter can be of the type that controls both its output voltage and its frequency for example of the type shown in Pat. application Ser. No. 589,928, filed on Oct. 27, 1966. With such an arrangement, the bridge circuit 90 would utilize six diodes since the voltage control is accomplished within the inverter.

In relating the systems shown in FIGS. 1 and 2, it will be appreciated that the voltage source 67 includes direct current source 80 and the output of inverter 76. The electric power and braking control 66 corresponds to relay switches 70, 72 and 73 which selectively connect the motor with either the inverter 76 or the source of direct current 80.

Figure 3:
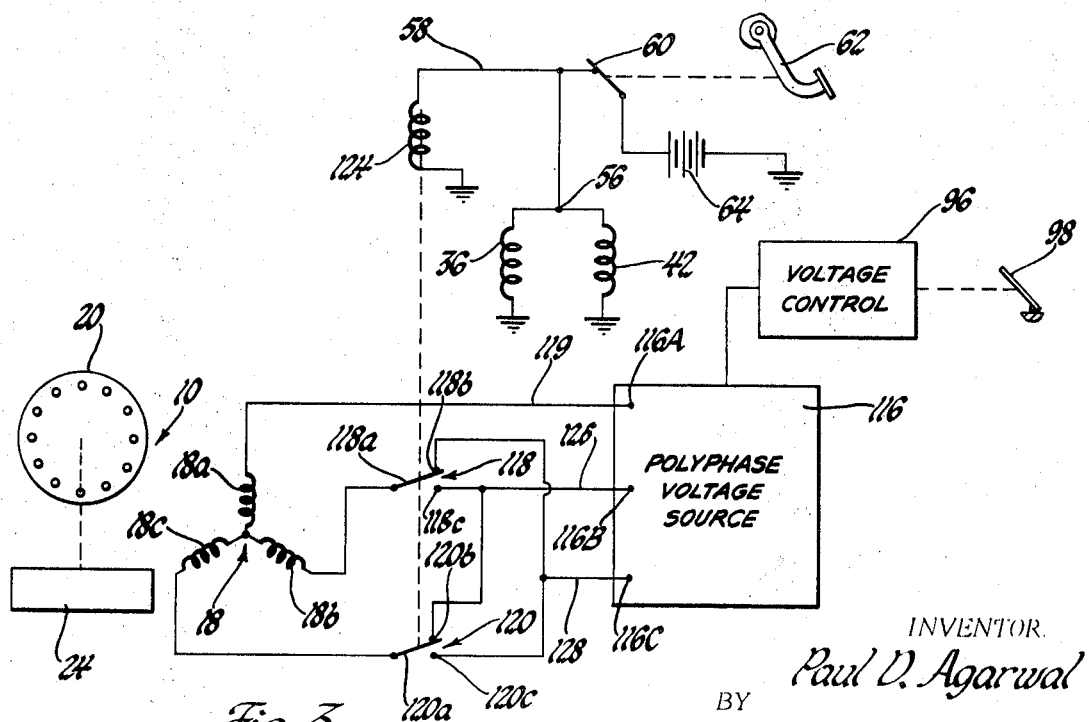
FIG. 3 is a schematic circuit diagram illustrating a plugging method of electrically braking an induction motor which can be used with the system of FIG. 1.

Referring now to FIG. 3, another electric braking system is illustrated which can be utilized in combination with hydraulic braking for braking an electric motor. In FIG. 3, the same reference numerals have been used as were used in FIGS. 1 and 2 to identify the same components in each FIG. In the FIG. 3 embodiment of the invention, a polyphase alternating current voltage source designated by reference numeral 116 is utilized to supply power to the induction motor 10. In FIG. 3, the electric braking is accomplished by plugging under the control of switches 118 and 120 which are controlled by relay coil 124. The switch 118 has a movable contact 118a connnected with one of the phase windings 18b of the motor and fixed contacts 118b and 118c. The switch 120 has a movable contact 120a connected to another phase winding 18c of the motor and fixed contacts 120b and 120c. The movable contacts 118a and 120a are shown in the energized position of relay coil 124 which operates these contacts to the position shown in FIG. 3 whenever it is energized. When the relay coil 124 is deenergized contact 118a engages contact 118c and contact 120a engages contact 120c.

The polyphase voltage source 116 has AC output terminals 116A, 116B and 116C. The output terminal 116A is directly connected with phase winding 18a of the three phase winding 18 whereas the output terminal 116B is connected with power supply conductor 126 which in turn is connected to fixed contacts 118c and 120b. The power output terminal 116C is connected with power supply conductor 128 which in turn is connected with fixed contacts 118b and 120c of switches 118 and 120.

When the power source 116 is supplying power to the winding 18 of the induction motor, this power will be supplied through conductors 119, 126 and 128 and through closed contacts 118a 118c and 120a and 120c when the coil 124 is deenergized as when switch 60 is open. This is the normal power supply for the motor. When the switch 60 is closed by operation of the brake pedal 62 the contacts 118a and 120a are shifted to the position shown in FIG. 3 and the connections between phase windings 18b and 18c and power supply terminals 116B and 116C is reversed to thereby provide a plugging mode of operation for the induction motor. This of course electrically brakes the motor to slow down the motor.

The polyphase voltage source 116 can take a wide variety of forms and can include the same elements as that shown in FIG. 2, namely a generator, a bridge circuit and an inverter. The system of FIG. 3 can also have slip frequency control if so desired of the same type shown in FIG. 2.

To summarize the operation of FIG. 3, it will be appreciated that when the brake pedal 62 is actuated the coils 124, 36 and 42 are all energized from direct current source 64. The energization of relay coil 124 causes the motor to be switched into a plugging mode of operation. The simultaneous energization of coils 36 and 42 causes the valve 34 to open and the valve 40 to close with a resultant filling of the interior of the induction motor 10 with cooling oil. It therefore is seen that the induction motor is simultaneously plugged, oil cooled and hydraulically braked whenever the switch 60 is closed.

The oil cooling and braking arrangement shown in FIG. 1 can be modified so as to continuously circulate cooling medium through the interior of the rotor and exterior of the stator in a manner described Pat. application Ser. No. 493,436, filed on Oct. 6, 1965, now U.S. Pat. No. 3,439,201 and assigned to the assignee of this invention. With such an arrangement the interior of the motor is only flooded with oil when electric braking takes place but the rotor and stator are oil cooled during normal running operation when the cooling and braking oil is drained from the motor housing. Both systems of course can be fed from a common hydraulic system if so desired.

It will of course be appreciated by those skilled in the art that when the interior of the motor 10 is supplied with cooling medium the cooling medium fills the airgap between the rotor and stator to provide a viscous drag on the rotor and also operates to cool the conductors of the rotor 20 which have heat generated therein during electric braking.

It will be appreciated by those skilled in the art that various modifications can be made of the embodiments disclosed herein for carrying out the invention without departing from the spirit and scope of this invention. In this regard it is not necessary that the fluid control system consist of solenoid-operated valves since the actuation of the valves in the proper sequence as disclosed herein could be done by a mechanical linkage and could be accomplished by other fluid control arrangements as long as the interior of the motor is supplied with a braking fluid during the time that the motor is connected in an electric braking mode of operation.

Where a solid-state inverter or cycloconverter is used for feeding the electric motor the plugging mode of operation can be attained without the use of mechanical switches by changing the trigger sequence to the switching elements of the inverter or cycloconverter to properly change the phase sequence.

Although mechanical switches have been disclosed in this application for connecting the electric motor in the electric braking mode of operation it will be appreciated by those skilled in the art that solid-state or electronic switches might be utilized as the switching devices for controlling the operation of the motor.

Although this application discloses supplying cooling oil to the interior of the motor during the braking cycle this invention is also applicable to motor drive systems where the interior of the motor would be evacuated to reduce windage losses and where the motor, during the electric braking cycle, would be supplied with air to cool the rotor and also provide some hydraulic braking of the rotor at the time when the motor is connected in its electric braking mode of operation.

It will be further appreciated by those skilled in the art that the invention disclosed herein is applicable to motors other than induction motors, for example alternating current synchronous motors, and will be useful where ever the supplying of a fluid cooling medium to the interior of the motor serves to hydraulically retard the rotor as well as dissipate the heat generated in the rotor of the motor when the motor is connected in the electric braking mode of operation. In this regard it will also be appreciated that the motor could be delta connected as well as Y-connected.

It is also within the purview of this invention to connect the rotor 20 with an impeller which would be located within the housing 12 and which would operate to act as a pump for circulating cooling medium through the motor.

The oil circulating system shown in FIG. 1 may include a heat exchanger (not shown) for cooling the oil leaving the motor. The pump 32 can be driven by the prime mover 106 or can be driven by some other power source such as an electric motor.

The source of direct current 80, shown in FIG. 2, can be a rectifier circuit connected with output winding 100 of alternator 102 and having direct current output terminals connected with conductors 78 and 82.

I claim:

1. A method of alternately powering and braking an electric motor having a housing containing a stator winding and a rotor, the steps comprising, electrically connecting said stator winding with a source of electrical power in such a manner that the source of power operates said motor in a power mode for normal running operation, electrically connecting said stator winding with a source of electrical power in such a manner that said motor operates in an electric braking mode of operation when it is desired to brake said motor, and while said motor is operating in said electric braking mode of operation supplying a fluid medium to the interior of said housing in contact with the exterior of said rotor and into the airgap of said motor, said fluid cooling medium operating to retard rotation of said rotor while simultaneously dissipating heat generated in said rotor due to the electric braking mode of operation and then terminating said electric braking and removing said fluid medium from the interior of said motor housing and connecting said stator winding with a source of electric power to provide normal running operation for said motor.

2. A system for selectively powering or braking an induction motor comprising, an induction motor having a stator winding and a squirrel cage rotor, a source of alternating current, a source of direct current, a switching means for electrically connecting said stator winding with said source of direct current to cause an electric braking of said motor or with said source of alternating current to provide normal power operation for said motor, a cooling medium inlet for supplying a cooling medium to the interior of said motor, fluid control means for controlling the application of cooling medium to the interior of said motor connected with said cooling medium inlet, a braking control means, means coupling said braking control means with said fluid control means and with said switching means whereby said braking control means controls the operation of both said fluid control means and said switching means, said braking control means in one position causing said switching means to connect said source of alternating current and said stator winding of said induction motor while maintaining said fluid control means in a condition of operation preventing the supply of cooling medium to the interior of said motor, said braking control means in a second position causing said switching means to disconnect said stator winding from said source of alternating current and connecting said stator winding with said source of direct current while substantially simultaneously operating said fluid control means to a condition of operation to supply cooling medium to the interior of said motor whereby said motor is simultaneously electrically braked and supplied with a cooling medium which operates to cool said rotor and to retard said rotor in its rotation, and means controlled by said braking control means for causing the removal of cooling medium from the interior of said motor following termination of electrical braking whereby said rotor is not impeded in its rotation by cooling medium when said motor is powered by said source of alternating current.

3. A system for selectively powering or braking an induction motor comprising, a polyphase induction motor having a polyphase stator winding and a squirrel cage rotor, a source of alternating current, a switching means connected between said source of alternating current and said polyphase stator winding of said motor, said switching means during a first condition of operation operating to connect said source of alternating current and said stator winding to power said motor and operating in a second condition of operation to reconnect two phase windings of said motor and two output terminals of said source of alternating current whereby said motor operates in a plugging mode of operation to electrically brake said motor, a source of cooling medium connected with the interior of said motor, a fluid control means for selectively disconnecting or connecting said source of cooling medium with the interior of said motor, a braking control device, means coupling said braking control device with said switching means and with said fluid control means, said braking control device in one position operating said switching means to said second condition of operation to cause a plugging operation of said motor while substantially simultaneously causing said fluid control means to supply a cooling medium to the interior of said motor, said braking control means in another condition of operation operating said switching means to said first condition of operation to electrically connect said motor and source of alternating current for normal running operation while operating said fluid control means to prevent said fluid medium from being supplied to the interior of said motor, and means controlled by said braking control device for causing the removal of cooling medium from the interior of said motor following termination of electrical braking whereby said rotor is not impeded in its rotation by cooling medium when said motor is powered by said source of alternating current.

4. A propulsion and braking system for selectively powering or braking an electrically powered vehicle comprising, an induction motor having a stator winding and a rotor, a housing for said motor, a driving wheel for said vehicle mechanically coupled to said rotor of said motor, an alternating current generator having an output winding and a rotor, a prime mover, means connecting said prime mover to said rotor of said alternating current generator, a switching circuit connected with said stator winding of said motor, said switching circuit in a first condition of operation operable to connect said alternating current generator and said stator winding of said motor whereby said vehicle is propelled by said motor, said switching circuit in a second condition of operation connecting said motor with a source of power such that said motor operates in an electric braking mode, a source of fluid cooling medium connected with the interior of said induction motor housing, a fluid control means connected with said source of cooling medium for controlling flow of cooling medium into said motor, said fluid control means in a first condition of operation connecting said source of cooling medium and the interior of said motor and during a second condition of operation disconnecting said source of cooling medium and the interior of said motor, a manually operable braking control means, means coupling said braking control means with said switching means and with said fluid control means, said braking control means when actuated operating said switching means to an electric braking mode while substantially simultaneously operating said fluid control means to a position connecting said source of cooling medium and the interior of said motor, said braking control means when not actuated causing said switching means to electrically connect the output winding of said alternating current generator and said stator winding of said motor while substantially simultaneously operating said fluid control means to disconnect said source of cooling medium and the interior of said motor, and means controlled by said braking control means for causing the removal of cooling medium from the interior of said motor following termination of electrical braking whereby said rotor is not impeded in its rotation by cooling medium when said motor is powered by said generator.

5. The vehicle propulsion and braking system according to claim 4 where the switching means is operative to connect said stator winding of said induction motor and said alternating current generator in a plugging mode of operation when said braking control means is actuated.

6. The vehicle propulsion and braking system according to claim 4 where the switching means is operative to disconnect said stator winding from said alternating current generator and connect it to a source of direct current to provide electric braking for said motor when said switching means is in said second condition of operation.